(No Model.) 5 Sheets—Sheet 1.
H. GOO & S. B. HOPKINS.
BOX MAKING MACHINE.
No. 557,798. Patented Apr. 7, 1896.
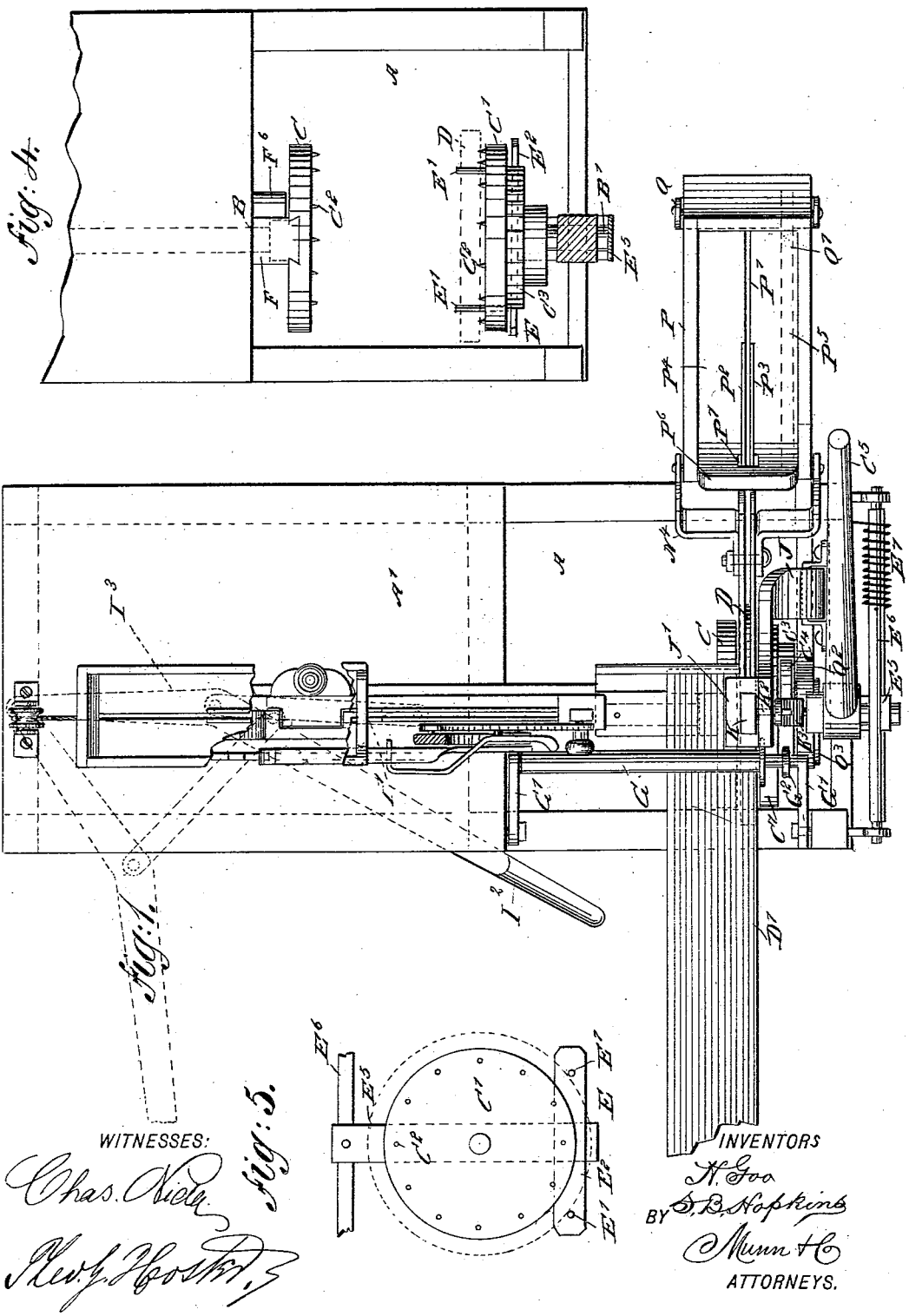

(No Model.) 5 Sheets—Sheet 2.
H. GOO & S. B. HOPKINS.
BOX MAKING MACHINE.
No. 557,798. Patented Apr. 7, 1896.
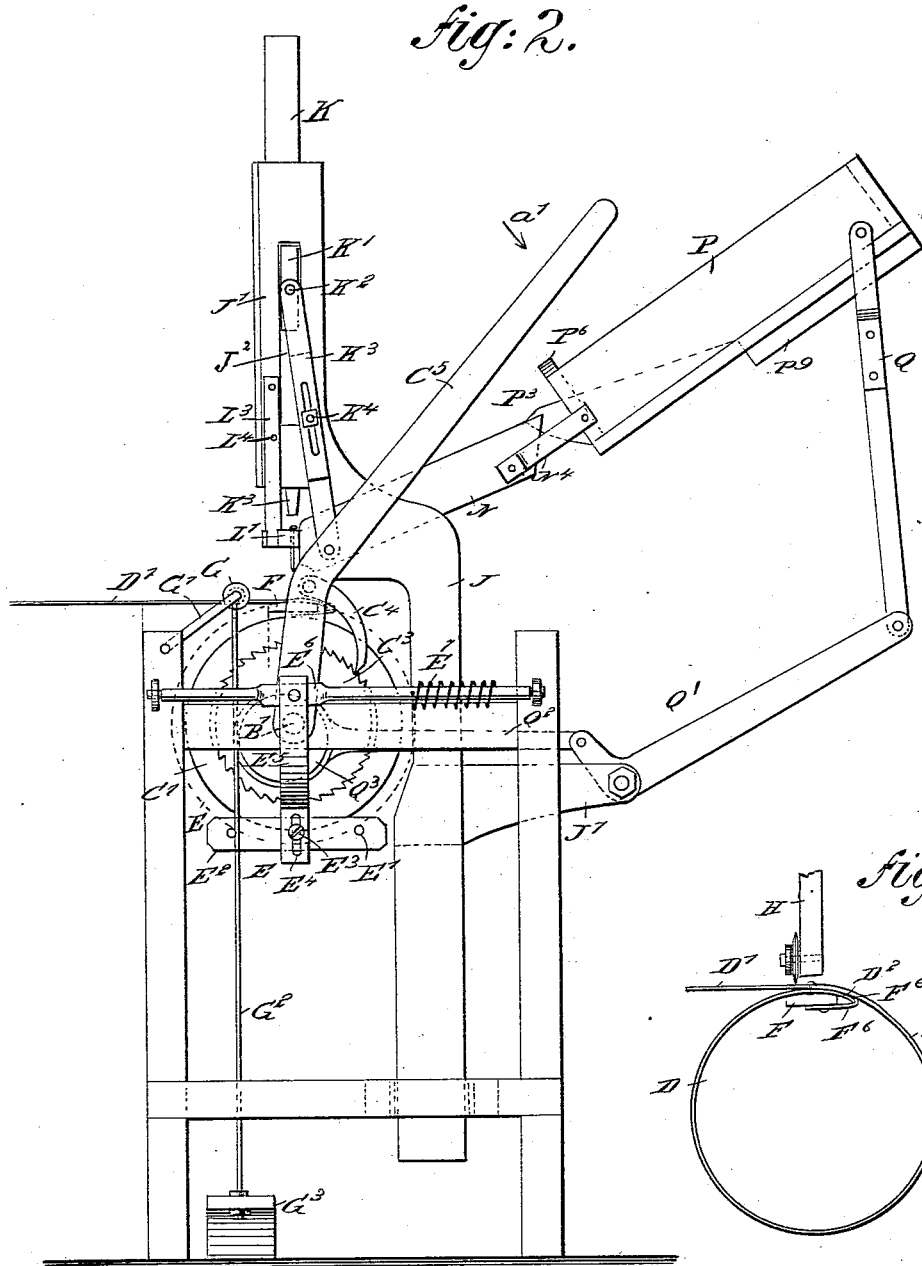
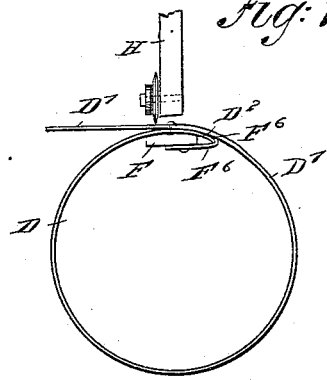
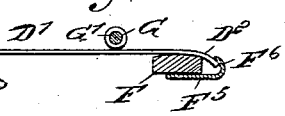
WITNESSES:
INVENTORS
H. Goo
S. B. Hopkins
BY Munn & Co.
ATTORNEYS.

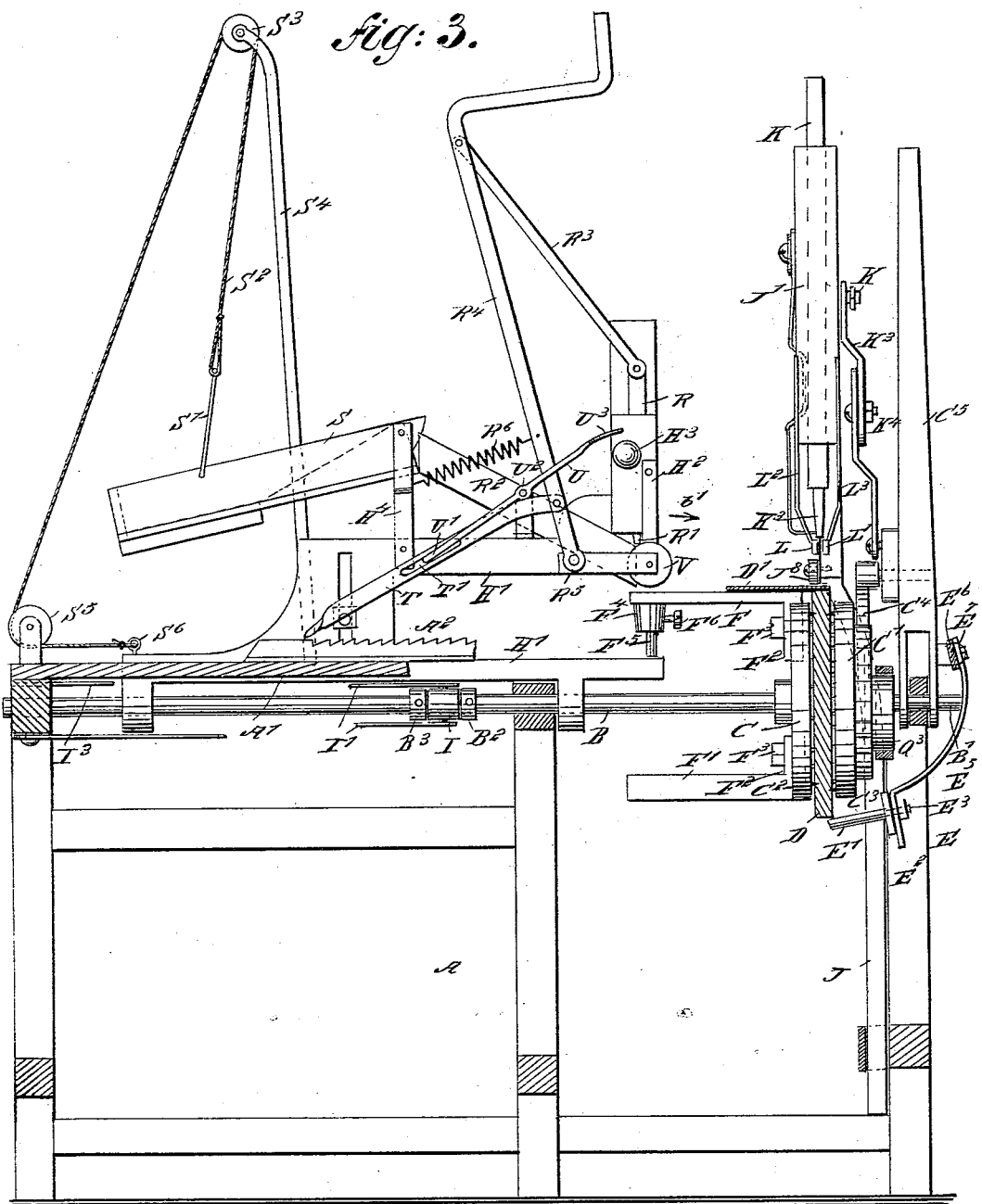

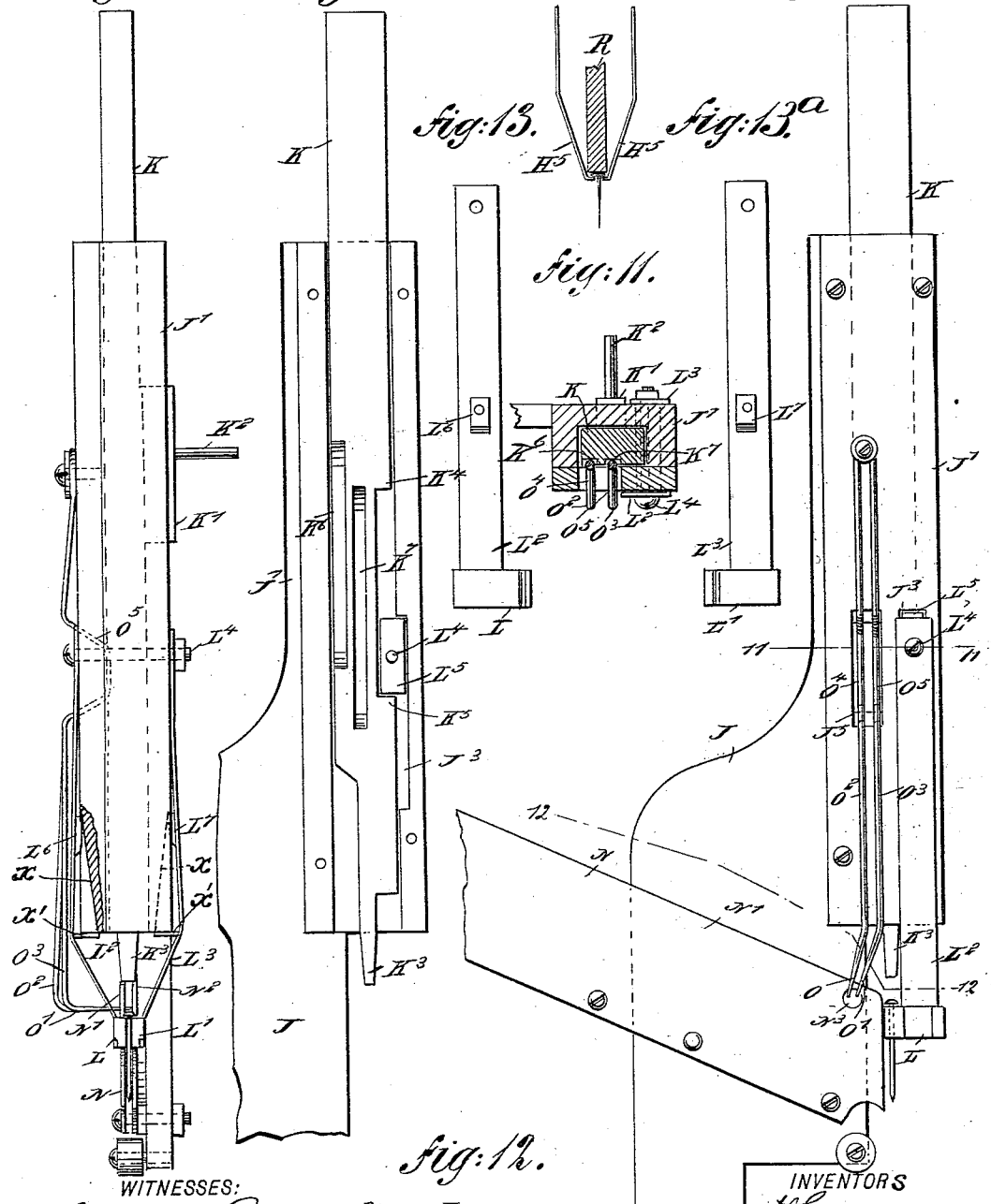

(No Model.) 5 Sheets—Sheet 5.

H. GOO & S. B. HOPKINS.
BOX MAKING MACHINE.

No. 557,798. Patented Apr. 7, 1896.

WITNESSES:
Chas. Nida
Theo. G. Hoster

INVENTORS
H. Goo
S. B. Hopkins
BY Munn & Co.
ATTORNEYS.

UNITED STATES PATENT OFFICE.

HIRAM GOO AND STUART BEECHER HOPKINS, OF DELEVAN, NEW YORK.

BOX-MAKING MACHINE.

SPECIFICATION forming part of Letters Patent No. 557,798, dated April 7, 1896.

Application filed February 1, 1895. Serial No. 536,963. (No model.)

*To all whom it may concern:*

Be it known that we, HIRAM GOO and STUART BEECHER HOPKINS, of Delevan, in the county of Cattaraugus and State of New York, have invented a new and Improved Box-Making Machine, of which the following is a full, clear, and exact description.

The invention relates to machines for making circular boxes for storing cheese and other articles, and is composed of a circular head and a side made from a hoop or band nailed at one of its edges on the periphery of the head, the overlapping ends of the band being tacked together.

The object of the invention is to provide a new and improved box-making machine which is comparatively simple and durable in construction, very effective in operation, and arranged to bend a strip or band of wood into a hoop, at the same time nailing one side thereof upon the head or side of the box and tacking the overlapping ends of the hoop, and at the same time cutting off the surplus material of the hoop to finish the box.

The invention consists principally of a head-clamping device having an intermittent rotary motion and a nailing device in conjunction with the clamping device to drive the nail into the hoop and head whenever the rotary motion of the clamping device ceases.

The invention further consists of a tacking device of special construction.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the views.

Figure 15:
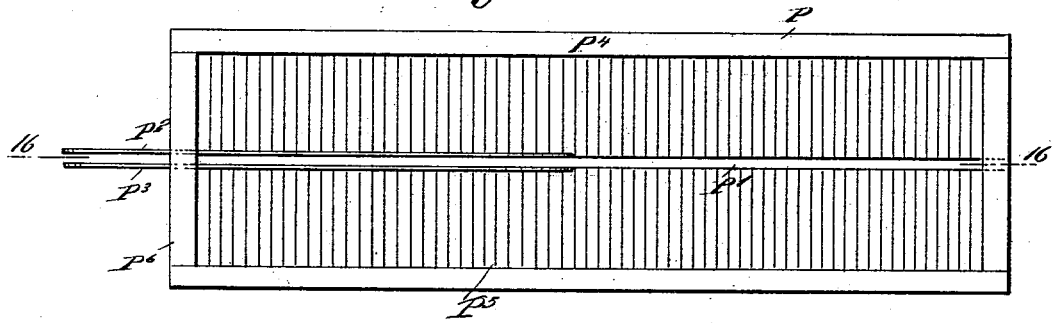
Figure 16:
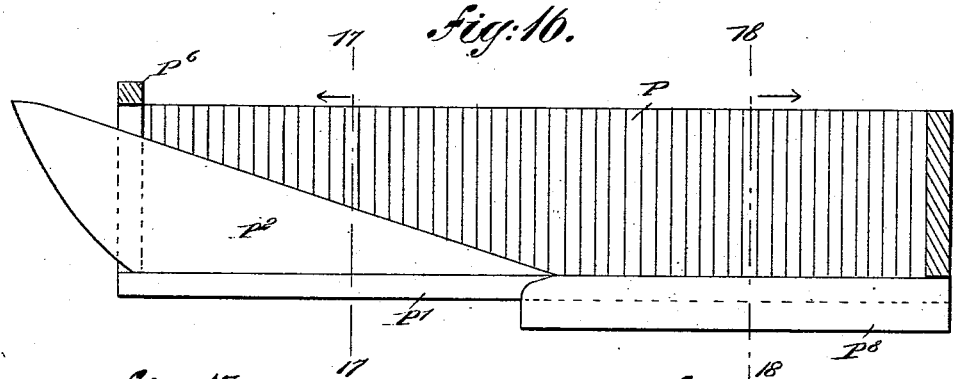
Figure 17:
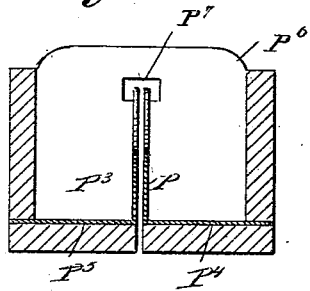
Figure 18:
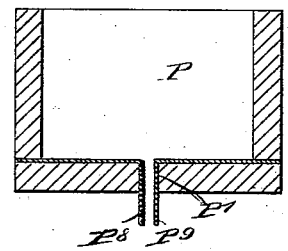
Figure 19:
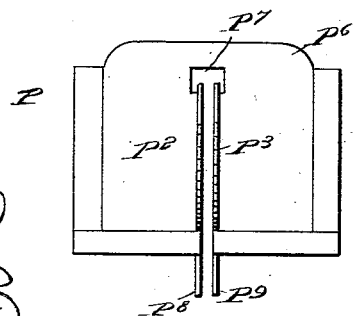

Figure 1 is a plan view of the improvement with parts broken out. Fig. 2 is an end elevation of the same. Fig. 3 is a sectional side elevation of the improvement with a box head and hoop in position. Fig. 4 is a plan view of the clamping device and centering device and with the clamping-jaws apart. Fig. 5 is an end elevation of one of the clamping-jaws and the centering device. Fig. 6 is a cross-section of the stop for the end of the box-hoop. Fig. 7 is an end elevation of the cutting device for the box-hoop. Fig. 8 is an enlarged end elevation of the nailing device. Fig. 9 is a front view of the same with parts in a different position. Fig. 10 is an end elevation of the same with the cover-plate removed. Fig. 11 is a sectional plan view of the same on the line 11 11 of Fig. 8. Fig. 12 is a like view of the same on the line 12 12 of Fig. 8. Figs. 13 and 13$^a$ are inner face views of the nail-holding jaws. Fig. 14 is a side elevation of the tack-holding jaws and plunger, the latter being in section. Fig. 15 is an enlarged plan view of the nail box or hopper. Fig. 16 is a sectional side elevation of the same on the line 16 16 of Fig. 15. Fig. 17 is a cross-section of the same on the line 17 17 of Fig. 16. Fig. 18 is a cross-section of the same on the line 18 18 of Fig. 16, and Fig. 19 is a front end elevation of the same.

The improved box-making machine is provided with a suitably-constructed frame A, in which are mounted to turn and to slide the shafts B and B' in alinement one with the other and carrying at their adjacent ends the clamping-jaws C and C', respectively, provided on their opposite faces with pins $C^2$, adapted to engage the faces of the box-head D, on the periphery of which is to be bent and nailed the strip of wood D', forming the hoop or side for the box.

The clamping-jaws C and C' are preferably made in the shape of disks, as indicated in the drawings, the disks being somewhat less in diameter than the diameter of the head D to be clamped between the disks. Now in order to bring the head D into a proper vertical position between the clamping-jaws C and C' previous to closing the latter on the opposite faces of the head D, a centering device E is provided, having the pins E', adapted to extend under the jaw C' and beyond the face thereof, so as to support the head D in a vertical position on the adjacent faces of the jaws C and C'. The pins E' project from a transversely-extending plate $E^2$. (See Figs. 3, 4, 5, and 6.) The plate $E^2$ is held adjustable by a bolt $E^3$ in a vertically-disposed slot $E^4$, formed in the lower end of a hanger $E^5$, pressing at or near its middle against the outer end of the shaft B', carrying the jaw C'. The upper end of this hanger $E^5$ is secured on a transversely-extending shaft $E^6$, mounted to turn in suitable bearings on the frame A and pressed on by a coiled spring $E^7$, one end of which is fastened to the frame and the other end to the shaft, so that the hanger $E^5$ presses with considerable force against the outer end of the shaft $B'$, holding the jaw $C'$ in a forward position and holding the pins $E'$ in a forward position to support the head D previous to the jaws C and $C'$ firmly clamping the head in position. After the head D is centered and clamped between the jaws C and $C'$, then the strip of wood $D'$ is passed over the top edge of the head D in the manner indicated in Figs. 1, 2, and 3. (See, also, Fig. 6.)

The projecting end $D^2$ of the strip of wood extends over the support F, which is arranged longitudinally and held adjustable radially on the jaw C, the support F being for this purpose provided with a radial arm $F^2$, engaged by a bolt $F^3$, held in the jaw C and passing through a slot in the said arm $F^2$. By this arrangement the support F can be moved in or out according to the inside diameter of the box to be made, so that the support F forms a firm rest for the end $D'$ of the strip established at the time the overlapping ends of the strip or hook are tacked together, as hereinafter more fully described, the support then being the anvil.

On the support F and projecting rearwardly is arranged the stop $F^5$, having the bent-up flange $F^6$, adapted to be engaged by the extreme outer end of the end $D^2$ of the strip $D'$, as plainly indicated in Fig. 6. The end $D^2$ is thus held in position during the time the head D is revolved, and the strip $D'$ is bent upon the periphery of the head D to form the hoop. In order to aid in bending the strip to form the hoop, a longitudinal roller G is provided, which presses on the top of the strip $D'$ in front of the support F. (See Figs. 1, 2, and 6.) This roller G is mounted loosely on the middle part of a ∪-shaped frame $G'$, pivoted at its ends on the main frame A and connected by a rod $G^2$ with a treadle $G^3$ under the control of the operator's foot, so that the roller G can be brought with more or less force on the top of the strip $D'$ to bend the latter as the head D revolves.

Opposite the support F is arranged a second similar support $F'$, likewise provided with a radial arm $F^2$ held adjustably on the jaw C by a bolt $F^3$. This part $F'$ serves also as a counterbalance to the part F. On the outer end of the support F is formed a boss $F^4$, in which is held adjustably an inwardly-extending rod $F^{15}$, adapted to be fastened to the boss $F^4$ by a set-screw $F^6$. (See Fig. 3.) The inner end of this rod $F^5$ is adapted to rest on the carriage H during the process of tacking the overlapped ends of the strip $D'$, and thus provide a firm support for the end of the support F. During the operation of nailing the strip $D'$ to the head the rod $F^{15}$ is raised and secured in the boss $F^4$, so that the parts may rotate.

In order to impart a longitudinal sliding motion to the shaft B, so as to close the jaws C and $C'$ on the opposite faces of the head D, the said shaft is provided under the top $A'$ with the fixed collars $B^2$ and $B^3$, between which is arranged a sleeve I, connected by links $I'$ with a lever $I^2$, disposed horizontally, and extending with its handle end to the front of the machine, so as to be under the control of the operator. The fulcrum of the lever $I^2$ is at the rear end of the main frame A in axial line with the shaft B, as plainly indicated in dotted lines in Fig. 1. It is obvious by this construction that when the shaft B is in its extreme forward or clamping position a portion of the lever $I^2$ will be in a straight or axial line with the shaft, so that such portion of the lever will serve as a locking device for the shaft and prevent an accidental rearward movement thereof. When the lever $I^2$ is moved to the right to clamp the head D, then the lever is moved past the center of extreme pressure, and consequently stays in position until the operator pulls it to the left to release the head D. Now it will be seen that by the operator moving the lever $I^2$ to the right or to the left he moves the shaft B in the same direction, so that the latter, on the movement to the right, moves the clamping-jaw C upon the head D, so as to press the latter in contact with the studded face of the jaw $C'$ to securely clamp the head D in place, at the same time moving the jaw $C'$ to the right, whereby its shaft $B'$ acts on the hanger $E^5$ to push the latter to the right and to withdraw the pins $E'$ from the lower edge of the head D, so that the latter is now supported only by the jaws C and $C'$. On moving the lever $I^2$ to the left the shaft B moves in a like direction, and the hanger $E^5$, by pressing on the shaft $B'$, pushes the jaw $C'$ likewise to the left for a short distance to bring the centering device E again in the proper position. On the further movement to the left of the shaft B the head D is completely released, so as to permit its removal after the strip $D'$ is fastened thereon, as hereinafter more fully described.

In order to turn the jaws C and $C'$ after the head D is clamped in position thereon, the rear face of the jaw $C'$ is provided with a ratchet-wheel $C^3$, engaged by a pawl $C^4$, fulcrumed on a lever $C^5$, hung loosely on the shaft $B'$, so that a movement of the lever $C^5$ to the rear in the direction of the arrow $a'$ (see Fig. 2) causes the pawl $C^4$ to turn the ratchet-wheel $C^3$, and consequently the jaw $C'$, head D, and jaw C. The lever $C^5$ on the return stroke in the inverse direction of the arrow $a'$ causes the pawl $C^4$ to glide over the teeth of the ratchet-wheel $C^3$, so that the jaw $C'$, head D, and jaw C remain at a standstill—that is, an intermittent rotary motion is given to the clamping-jaws and the head D, and during the resting time of the head the nailing of the strip $D'$ to the head takes place in the manner presently to be described.

A post J is fitted to slide vertically in suitable bearings on the right-hand end of the frame A next to the clamping-jaw C', and on the upper end of this post J is secured a box J', in which is fitted to slide vertically the plunger K for driving the nails into the strip D' and head D, the nails being placed suitable distances apart, as hereinafter more fully described.

The plunger K receives a reciprocating motion from the lever C$^5$, and for this purpose the said plunger K is provided on one side with a block K', fitted to slide in a slot J$^2$, formed in the corresponding side of the casing J'. From the block K' projects a pin K$^2$, pivotally connected by a link K$^3$ with the said lever, the said link K$^3$ being preferably made in two parts fastened together by a bolt K$^4$, so that the link can be lengthened or shortened, according to the size of the box to be nailed.

The lower end K$^3$ of the plunger K is adapted to engage the head of the nail, held by its shank between the jaws L and L', formed on their inner faces with vertically-disposed grooves for the reception of the shank of the nail, as will be readily understood by reference to Figs. 12, 13, and 14. The jaws L and L' are fastened on the lower ends of spring-arms L$^2$ and L$^3$, extending upwardly on opposite sides of the casing J' to be fastened by a bolt L$^4$ to a block L$^5$, fitted to slide vertically in a longitudinally-extending recess in the casing J', the said block being adapted to be moved downward by the lower end K$^3$ of the plunger K pressing down upon the head of the nail, (see Fig. 14,) and the block is lifted by a shoulder K$^5$, formed on the plunger K. Thus the plunger K moves the block L$^5$, and consequently the jaws L and L', up or down, so as to receive the nail and move it into proper position for being driven home by the plunger through the strip D' into the head D. The jaws L and L' are opened before reaching a lowermost position, so as to permit the lower end K$^3$ of the plunger to drive the nail home after the same is started in the strip D'.

In order to open the jaws to allow a nail to pass between the ends adjacent to the chute to the enlarged opening, the spring-bands L$^2$ and L$^3$ are provided on their inner faces with blocks L$^6$ and L$^7$, respectively, adapted to engage against inclined faces formed in the sides of the casing J', as indicated at $x$ in Fig. 9, so that the jaws L and L' may be separated on their upward stroke sufficiently to allow a nail to pass between them to the enlarged openings in the jaws, as will be readily understood by reference to Fig. 9. In order to deliver the nails to the jaws L and L', a chute N is provided, secured on the post J, as indicated in Fig. 8, the said chute comprising two transversely-extending and upwardly-inclined plates N' and N$^2$, between which pass the nails by their own gravity, down to the jaws L and L', located in front of the front edges of the said plates.

In order to deliver but one nail at a time to the jaws L and L', the following device is provided: In the outermost plate N' is formed an aperture N$^3$, through which project the pins O and O', formed on the upwardly-extending arms O$^2$ and O$^3$, respectively, fastened to one side of the casing J. The arms O$^2$ and O$^3$ are formed with bends O$^4$ and O$^5$, respectively, extending through a side opening J$^5$ at one side of the plunger K to engage grooves K$^6$ and K$^7$, respectively, in the side of the said plunger, as is plainly illustrated in Fig. 10. The grooves K$^6$ and K$^7$ are arranged in such a manner that when the plunger K is in an uppermost position, as illustrated in Fig. 10, then the bend O$^5$ of the arm O$^3$ is in its groove K$^7$, so that the pin O' extends through the opening N$^3$ to the inner face of the second plate N$^2$, thus stopping the lowermost nail between the two plates N' and N$^2$. Now when the plunger moves downward, then the bend O$^4$ in the other arm O$^2$ moves into its groove K$^6$, so that the pin O likewise moves through the opening N$^3$ to the inner face of the plate N$^2$, thus stopping between the shanks of the nail resting against the arm O$^2$ and the next nail in the chute N. On the further downward movement the bend O$^5$ moves out of the groove K$^7$, so that the arm O$^3$ is moved to one side and its pin O' is moved out of the space between the plates N' and N$^2$, so as to allow the lowermost nail—that is, the one between the two pins O and O'—to slide down against the rear side of the plunger K, it being understood that the nail still remains between the plates N' and N$^2$ at the lower edge thereof. Now when the plunger K moves over the lower edges of the plates N' and N$^2$, then the nail can pass to the jaws L and L' to be supported thereon—that is, the shank of the nail passes into the grooves of the jaws with the head resting on top of the jaws. (See Fig. 9.) As the jaws L L' arrive at nearly the end of their downward movement the blocks L$^6$ L$^7$, which are beveled at their lower ends, will strike against projections $x'$ on the lower portion of the box J', and by riding over them will thus force the jaws apart, so that the plunger may continue moving between them to force the nail its full length.

On the upward stroke of the plunger K the bend O$^5$ first passes again into its groove K$^7$, so that the pin O' moves into the space between the plates N' and N$^2$, and on the further upward movement of the plunger the bend O$^4$ moves out of the groove K$^6$ to release the next nail, which latter then passes down the chute N to rest against the pin O'. The above-described operation is then repeated, so that one nail only at a time is permitted to pass to the pin O' and from the latter to the jaws L and L' at the time the jaws move upward.

The upper ends of the plates N and N' receive the nails in an assorted condition from a nail-box P, connected by links N$^4$ with the upper ends of the chute N, so that the nail-box P is free to swing, and the swinging motion is given to the nail-box by connecting its rear ends with a link Q, extending downward and connected with one arm of a bell-crank lever Q', fulcrumed on an arm J⁷, projecting transversely from the post J.

The bell-crank lever Q' is pivotally connected with an eccentric-rod Q² of an eccentric Q³, secured on the shaft B', so that the intermittent rotary motion of the latter causes an up-and-down swinging of the nail-box P by means of the eccentric-rod Q², eccentric Q³, bell-crank lever Q', and link Q.

The eccentric Q³ is made somewhat wider than the eccentric-strap, so that it may be moved with the shaft B' transversely through the eccentric-strap without imparting lateral movement thereto.

In order to assort the nails in the box P, the latter is arranged as follows: In the nail-box P is formed a longitudinal slot P', (see Figs. 15, 16, 17, 18, and 19,) and from the sides of the slot in the front half of the box P extend the plates P² and P³, struck up from plates P⁴ and P⁵, made of metal and forming a lining for the bottom of the nail-box, the fronts of the plates P² and P³ projecting through the front end P⁶ of the box, the latter being provided at its front end with an enlarged recess P⁷ at the top edges of the plates P² and P³ for the passage of the head of the nail, the shank of which travels between the plates P² and P³. The bottom plates P⁴ and P⁵ are formed in the rear half of the slot P' with the downwardly-extending flanges P⁸ and P⁹, as is plainly shown in Figs. 18 and 19, so that the nails, shanks downward, can readily pass into the said slot P' to be guided forward in the same and to travel along the plates P² and P³ as an up-and-down swinging motion is given to the nail-box from the eccentric Q³. The projecting ends of the plates P² and P³ extend over and are in constant contact with the upper ends of the plates N' and N² of the chute N, so that whenever the nail-box P is swung into an uppermost position, as shown in Fig. 2, then a number of nails, assorted and hanging in proper position on the plates P² and P³, slide from the latter upon the plates N' and N², and down the same to be delivered one by one to the jaws L and L' by the action of the pins O' and O², as previously explained.

In order to tack the overlapping ends of the strip D' after the latter is nailed to the head D, as previously described, a tacking device is provided supported from an overhanging arm H' of the carriage H previously mentioned. On the forward ends of the overhanging arm H' of the carriage H is secured a frame H², provided with a knob H³, adapted to be taken hold of by the operator to impart a forward and backward sliding motion to the carriage H.

In the frame H² is mounted to slide a plunger R, similar to the plunger K and adapted to drive, with its lower end R', a tack into the overlapping ends of the strip D after the carriage H is pulled forward in the direction of the arrow b'. (See Fig. 3.) Tacks are delivered to the plunger R from a chute R², supported on the overhanging arm H' and similar in construction to the chute N, previously mentioned, so that further description of the same is not deemed necessary.

The plunger R is pivotally connected at its upper end by a link R³ with a hand-lever R⁴, fulcrumed at R⁵ on the overhanging arm H' of the carriage H, and this lever R⁴ is held normally in the position shown in Fig. 3 by a spring R⁶, attached to the bracket H⁴, fastened to the overhanging arm H' of the carriage H. Now when the lever R⁴ is moved forward— that is, to the right—and the link R³ moves the plunger R downward a tack is driven into the overlapping ends of the strip D' and when the lever B⁴ is moved backward or to the left, the pawl T, engaging with its free end the rack Q², is used as a fulcrum and the carriage H is forced forward a short distance over the strip D' in a position to drive the next tack. Tacks are fed to the chute R² from a tack-box S, similar in construction to the nail-box P, previously described, so that further description is not deemed necessary, the said box S being pivoted on the upper end of the bracket H⁴ to discharge the tacks upon the upper end of the chute R². A swinging motion is given to the tack-box S from the moving carriage H, and for this purpose the rear end of the tack-box S is hung on the link S', connected with a rope S², extending upwardly and passing over a pulley S³ secured on a bracket S⁴ attached to the frame A. The downwardly-extending end of the rope S², after leaving the pulley S³, passes under a pulley S⁵ to then connect with an eye S⁶, attached to the carriage D, as is plainly shown in Fig. 3. Now when the carriage H is moved forward in the direction of the arrow b', then a pull is exerted on the rope S², so that the tack-box S is lifted and a number of tacks sufficient for nailing the overlapping edges of the strip D' is passed upon the chute R² to be delivered by the latter successively to the plunger R to be driven into the overlapping ends.

It is understood that the tacks are delivered to the plunger R in the same way that the nails are delivered to the plunger K, and the tack, while it is being driven, is held vertical and rigid by the head alone instead of by the shank, as is the case with the nail. This is done by means of the detached spring jaws or bands H⁵ H⁵, (see Fig. 14,) which are not provided at their lower extremities with the jaws L and L', as those are for the nails, but form simply a slot or recess at their lower ends, so that the tack slides from the chute into it and hangs by the head. These spring-bands H⁵ are held up by means of their pressing with sufficient tension against the casings of the frame H² to hold the tack rigid when the plunger R is pressing upon it and forcing it, together with the spring-bands, downward. This tack device works in every respect the same as the nailing device already described, excepting that the tack is held by the head, while the nail is held by the shank.

In order to regulate the distances the tacks are to be driven apart, the lever $R^4$ is provided with a pawl T, adapted to engage with its free end a rack $A^2$, forming part of the top $A'$ of the frame A. This pawl T is provided with a slot $T'$, engaged by a pin U, projecting from a lever $U'$, fulcrumed at $U^2$ on a bracket secured to the overhanging arm H. The handle end $U^3$ of this lever U is in close proximity to the knob $H^3$, so that the operator can conveniently control this lever U by the thumb of the hand having hold of the said knob $H^3$, to lift the pawl T out of engagement with the rack $A^2$ whenever it is desired to shift the carriage H backward after the overlapping ends of the strip $D'$ are tacked.

On the front end of the overhanging arm $H'$ of the carriage H is journaled the rotary cutter V, adapted to cut off the surplus material of the strip $D'$ next to the row of tacks driven into the overhanging ends by the plunger R.

The post J, carrying the nailing device, as previously described, is made vertically adjustable by means of the link $K^3$, so as to permit of using the nailing device with different-sized heads D, it being understood that the post J is moved upward a suitable distance to hold the friction-roller $J^3$ up off from the strip $D'$ when the lever $C^5$ is back and at rest, but when the lever $C^5$ is brought forward to drive the nail the post J is allowed to lower, since it hangs on the block $K'$ of plunger K, and the friction-roller $J^3$ rests on the top of the strip $D'$ directly over the top of the head D, as indicated in Fig. 3. It is further understood that the link $K^3$ has to be lengthened and shortened, according to the size of the head D under treatment.

The operation is as follows: When the lever $I^2$ is in a rearmost position, then the jaws C and $C'$ are open, as indicated in Fig. 4, and the centering device E is in such a position as to receive and support the head D and hold the latter centrally relative to the jaws. When the head is placed in position, then the operator moves the lever $I^2$ to the right into the position shown in Fig. 1, so that the shaft B is moved to the right and the head D is clamped between the jaws C and $C'$, as previously explained, and at the same time the centering device E is pushed to one side by the end of the shaft $B'$ striking the hanger $E^5$. The operator now places the strip $D'$ over the top of the head D, so that one edge is flush with the face of the head D next to the jaw $C'$, as indicated in Fig. 3, the end of the strip $D'$ resting in the flange $F^5$, attached to the support F, as indicated in Fig. 6, the operator now pressing the treadle down, so as to move the roller G firmly in contact with the top of the strip $D'$ in front of the support F. The operator now swings the lever $C^5$ forward in the inverse direction of the arrow $a'$, causing a downward sliding of the plunger K, so that the lower end $K^3$ thereof drives a nail held by the jaws L and $L'$ into the end $D^2$ of the strip $D'$ and head D. On the return stroke of the lever in the direction of the arrow $a'$ the plunger K is returned in an upward direction, and a new nail is passed to the jaws, as previously explained, and at the same time the jaws C and $C'$ with the head D are turned and the strip $D'$ is bent over part of the periphery of the head. On the next forward stroke of the lever $C^5$ a second nail is driven into the head D, and this operation is repeated until a complete revolution has been made by the head D, so that the ends of the strip D are overlapped. When this has been done, then the operator takes hold of the knob $H^3$ and draws the carriage forward to the strip D. An intermittent movement to the right is imparted to the carriage H by the backward and forward motions of the lever $R^4$, so that the cutter V cuts off the surplus part of the strip $D'$ and tacks are driven by the plunger R into the overlapping ends of the strip until the frame $H^2$ is close to the bottom of the strip $D'$ at the head D.

It is understood that the tacks are driven into the overlapping edges of the strip resting over the metal support F, so that the points of the tacks after being driven through the overlapping ends are clenched on the inside of the strip to securely fasten the overlapping ends together. When this has been done, the operator presses the lever U to lift the pawl T out of engagement with the rack $A^2$ to permit of shifting the carriage H back to its left-hand position.

Having thus fully described our invention, we claim as new and desire to secure by Letters Patent—

1. A box-nailing machine, comprising a carriage mounted to slide longitudinally, a rotary work-holding device normally forward of the carriage, a tacking device on said carriage and comprising mechanism for driving tacks in the overlapped ends of the hoop on the work-holding device, mechanism having connection with the tacking device for imparting a step-by-step motion to the carriage, mechanism for rotating the work-holder and a nailing mechanism comprising a plunger and nail guides or chutes for nailing the work after the tacking operation and arranged to drive nails in a line at right angles to the line of tacks, substantially as shown and described.

2. A box-making machine, provided with a head-clamping device, comprising two alined shafts mounted to turn and to slide, jaws secured to the adjacent ends of the said shafts, a centering device provided with two pins extending under the jaws to support the head previous to the latter being clamped between the jaws, the said centering device being also provided with a hanger in contact with one of the said shafts, and a lever for imparting a sliding motion to the other shaft, substantially as shown and described.

3. A box-making machine, having clamping-jaws and provided with a centering device comprising a spring-pressed rotary shaft, a hanger secured on the said shaft, a transverse arm held on the hanger, and pins projecting from the said transverse arm, and adapted to engage beneath and support the head, substantially as shown and described.

4. In a box-making machine, the combination with a carriage, of a tacking mechanism carried thereby, a lever operated by a movement of the tacking mechanism for imparting a reciprocating motion to the said carriage, and a rotary cutter journaled in an overhanging arm of the said carriage, substantially as shown and described.

5. In a box-making machine, provided with a nailing device comprising a plunger fitted to slide, vertically-reciprocating jaws held on spring-arms, and adapted to support the nail below the plunger, a chute for delivering the nails successively to the said jaws, and blocks on the spring-arms coacting with inclines and projections on the plunger-casing, for operating the said jaws from the said plunger, as set forth.

6. A box-making machine, provided with a nail-box formed with a longitudinal slot in its bottom, and parallel plates extending from the sides of the said slot and from near the middle thereof upwardly and forwardly through the front end of the box, the said end of the box being formed with a transversely-enlarged opening above the top edges of the plates for the passage of the nail-heads, the said plates being continued through and considerably forward of said enlarged opening, substantially as shown and described.

7. In a box-making machine, the combination with rotary clamping-jaws for a box-head, of a nail-machine, comprising a fixed casing, a reciprocating plunger in said casing, spring-jaws carried by the plunger and adapted to receive the nail, a block on each of said spring-jaws, inclined ways and projections on the casing coacting with the blocks for operating the jaws, a chute provided with two plates arranged parallel with one another and discharging at their lower ends upon the said spring-jaws, and pins controlled by direct contact with said plunger to successively deliver the nails from the lower end of the said chute to the said jaws, substantially as shown and described.

8. A box-making machine, provided with clamping-jaws, one of said jaws having horizontal and longitudinal supports radially adjustable with relation to the axis of said jaw to support the strip forming the side for the box, substantially as shown and described.

9. In a box-making machine, the combination with a longitudinal support for the overlapping ends of the strip forming the hoop, a reciprocating carriage, a tacking device supported on the said carriage, and adapted to drive tacks through the overlapped ends directly over the said support, so that the points of the tacks are clenched on the inside of the overlapped ends, means, substantially as described for controlling the forward feeding of the said carriage to drive the tacks a considerable distance apart, and a tack-assorting box having a swinging motion controlled from the said carriage and adapted to deliver assorted tacks to the chute of the said tacking device, as set forth.

10. In a box-making machine, the combination with rotary head-clamps, and a supporting-anvil adjustably supported by one of said clamps, of a carriage adapted to slide longitudinally, and a tacking device held on said carriage and adapted to drive tacks in the lapped ends of a box side, substantially as described.

11. In a machine for making circular boxes, the combination with rotary head-clamping jaws and an adjustable support on one of said jaws, of a carriage movable lengthwise of said support and a cutter mounted on said carriage and adapted to cut off a surplus part of a side strip of a box, substantially as described.

HIRAM GOO.
STUART BEECHER HOPKINS.

Witnesses:
W. G. WOODWORTH,
E. M. LEWIS.